United States Patent [19]
Shimazaki

[11] Patent Number: 5,493,690
[45] Date of Patent: Feb. 20, 1996

[54] FOLDABLE PORTABLE TELEPHONE SET

[75] Inventor: Mamoru Shimazaki, Tokyo, Japan

[73] Assignee: NEC Corporation, Tokyo, Japan

[21] Appl. No.: 266,569

[22] Filed: Jun. 28, 1994

[30] Foreign Application Priority Data

Jun. 28, 1993  [JP]  Japan .................................. 5-178526

[51] Int. Cl.$^6$ ................................................. H04M 1/19
[52] U.S. Cl. .............................. 379/63; 379/58; 379/61; 379/387; 379/421
[58] Field of Search ...................................... 379/422, 421, 379/433, 434, 387, 67, 58, 61, 63

[56] References Cited

U.S. PATENT DOCUMENTS

| | | | |
|---|---|---|---|
| 4,707,853 | 11/1987 | Hasegawa | 379/128 |
| 4,924,193 | 5/1990 | Saito et al. | 379/129 |
| 5,111,503 | 5/1992 | Takagi | 379/433 |
| 5,175,759 | 12/1992 | Metroka et al. | 379/58 |
| 5,214,688 | 5/1993 | Szlam et al. | 379/67 |

FOREIGN PATENT DOCUMENTS

| | | | |
|---|---|---|---|
| 0208349 | 9/1986 | Japan | 379/421 |
| 0123555 | 5/1989 | Japan | 379/421 |
| 0279659 | 11/1989 | Japan | 379/421 |
| 2087686 | 5/1989 | United Kingdom | 379/421 |

*Primary Examiner*—Jeffery A. Hofsass
*Assistant Examiner*—Scott Wolinsky
*Attorney, Agent, or Firm*—Foley & Lardner

[57] ABSTRACT

A foldable portable telephone set which allows switching between a speech holding condition and a speaking condition without the necessity of an operation of a key thereby to prevent an operation in error. An open or closed condition of a cover section relative to a body section is detected by means of a reed switch provided on the cover section, a magnet provided on the body section, and a detection circuit for detecting an on- or off-state of the reed switch. A speech holding condition is established when it is detected that the cover section is closed during speech. In the speech holding condition, manually operable keys are covered with the body section and not exposed outside.

9 Claims, 2 Drawing Sheets

FOLDABLE PORTABLE TELEPHONE SET

BACKGROUND OF THE INVENTION

1. Field of the Invention

This invention relates to a portable telephone set, and more particularly to a portable telephone set of the foldable type.

2. Description of the Related Art

Conventionally, a foldable telephone set of the type mentioned is constructed such that a telephone set body is divided into two sections, including a body section and a cover section, and these two sections are interconnected by means of a hinge mechanism or the like. Thus, when the telephone set is to be used, the cover section is opened relative to the body section, but when the telephone set is not used, they are folded to facilitate transportation of the telephone set.

By the way, in a portable telephone set in recent years, when a call to the user of the telephone set is terminated, if the user makes a response to the terminated call by operation of a key or the like, then a speaking condition with an originating person is established. Then, when it is intended to end the speech, a key is manually operated. The portable telephone set has a response holding function for notifying, when the user cannot make a response when a call is terminated, this fact to the originating person. Also, the portable telephone set has a speech holding function for temporarily holding, when it is in a speaking condition, the speech. The response holding function and the speech holding function are performed each by way of an operation of a key.

In the conventional portable telephone set of the construction described above, in order to cause, for example, the speech holding function to operate, it is required to operate a predetermined key during speech. However, since a key of a telephone set of the type described is small, the operability is so low that another key may be manually operated in error. If a wrong key is manually operated in this manner, then the speech may be disconnected. On the other hand, a key may be manually operated in error while the speech holding function is operating, and this may cancel holding of the speech or cause interruption of the speech.

Particularly, since the body section and the cover section of a foldable portable telephone set are formed with a comparatively small thickness, switches having a comparatively small height are progressively used for keys disposed on the cover section. Where such switches are employed, not a key to be operated but another adjacent key is likely operated manually, resulting in such troubles as described above. Consequently, such troubles as described above are liable to take place.

SUMMARY OF THE INVENTION

It is an object of the present invention to provide a foldable portable telephone set wherein switching between a speech holding condition and a speaking condition is allowed without the necessity of manual operation of a key thereby to prevent an operation of the telephone set in error.

In order to attain the object described above, according to the present invention, there is provided a foldable portable telephone set, which comprises a body section, a cover section hinged for opening and closing movement relative to the body section, detection means for detecting an open or closed condition of the cover section relative to the body section, and means for establishing a speech holding condition when it is detected by the detection means during speech that the cover section is closed.

The detection means may include a reed switch provided on one of the body section and the cover section, a magnet provided at a position of the other of the body section and the cover section at which the magnet is positioned adjacent to the reed switch when the cover section is closed, and a detection circuit for detecting an on or off condition of the reed switch.

The foldable portable telephone may further comprise a microphone serving as a transmitter, means for generating a speech holding message, and a switch circuit for switching between the microphone and the speech holding message generation means, the switch circuit being switched to the speech holding message side when it is detected that the cover section is closed.

The foldable portable telephone set may further comprise a display device, and a control section for controlling the display device or back light means of the display device between an on-state and an off-state in response to detection by the detection means.

With the foldable portable telephone set, when it is in a speaking condition, switching to a speech holding condition can be established only by manually operating the cover section into a closed condition. Consequently, otherwise possible manual operation in error is prevented. Further, since the cover section is in a folded condition when the foldable portable telephone set is in the speech holding condition, the manually operable keys will not be manually operated in error at all. Consequently, otherwise possible occurrence of cancellation of such holding condition, interruption of speech or a like trouble can be prevented.

Further, where the means for detecting an open or closed condition of the cover section is constituted from such a reed switch, a magnet and a detection circuit as described above, the present invention can be applied to a conventional foldable portable telephone set without modifying the mechanical construction of the telephone set very much.

Further, the switch circuit can be switched, when the cover section is closed, to transmit a speech holding message to the other party side.

In addition, where the foldable portable telephone set is constructed such that the display device itself or the back light means for such display device is automatically switched on or off in response to an opening or closing movement of the cover section, the power dissipation of the telephone set can be reduced.

The above and other objects, features and advantages of the present invention will become apparent from the following description and the appended claims, taken in conjunction with the accompanying drawings in which like parts or elements are denoted by like reference characters.

DESCRIPTION OF THE PREFERRED EMBODIMENT

Figure 1B:
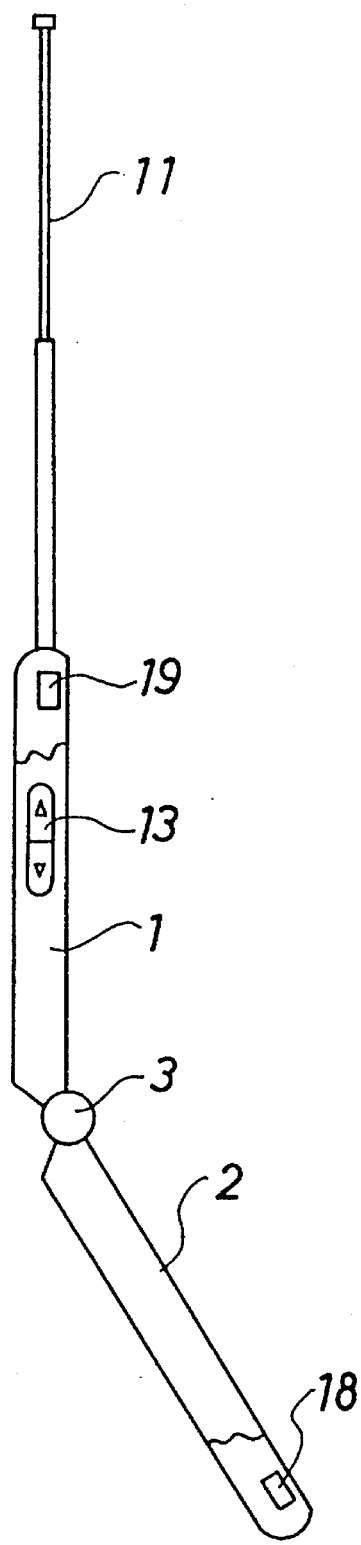
FIGS. 1(a) and 1(b) are a front elevational view and a side elevational view, respectively, of a foldable portable telephone set in a speaking condition with a cover section opened showing a preferred embodiment of the present invention.
Figure 1A:
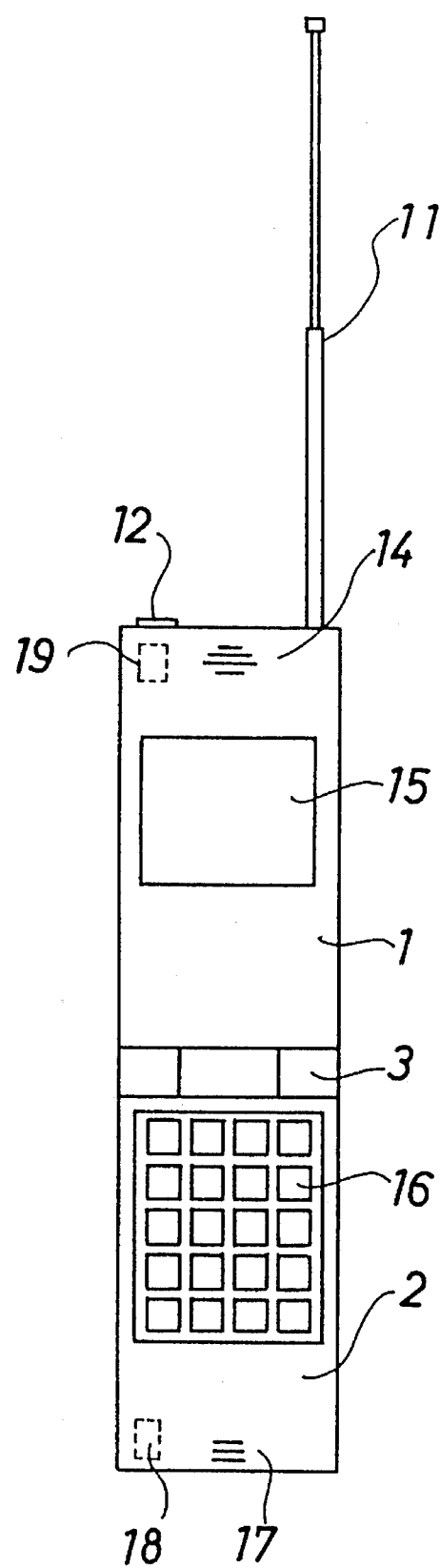
Figure 2:
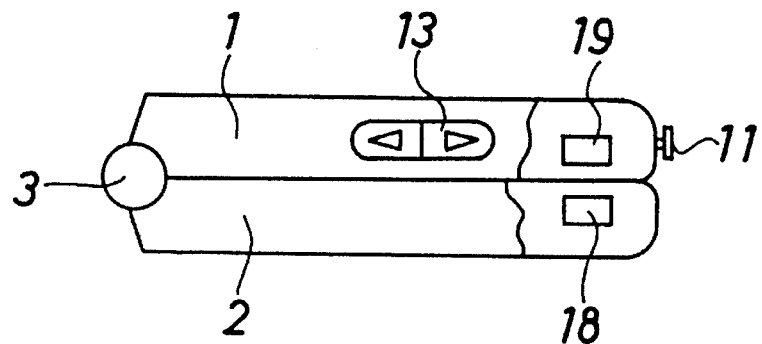
FIG. 2 is a side elevational view of the foldable portable telephone set of FIGS. 1(a) and 1(b) but in a speech holding condition during transportation with the cover section closed.

Referring first to FIGS. 1(a), 1(b) and 2, there is shown a foldable portable telephone set to which the present invention is applied. The foldable portable telephone set includes a telephone set body which is constituted from a body section 1 in the form of a thin housing, and a cover section 2 in the form of another thin housing having a substantially same thickness as the body section 1. The body section 1 and the cover section are interconnected by a hinge mechanism 3 so that the cover section 2 can be opened and closed relative to the body section 1 by way of the hinge mechanism 3 to set the telephone set body into a folded condition or an open condition. An antenna 11, a power source switch 12, a volume button 13, a receiver 14 and a display device 15 in the form of a liquid crystal display (LCD) device are disposed on the body section 1, and a plurality of manually operable keys 16 and a transmitter 17 in the form of a microphone are disposed on the cover section 2. Further, though not shown, various circuit elements are disposed in the inside of the body section 1 and the cover section 2, and in addition to them, a reed switch 18 is disposed on the cover section 2, and a permanent magnet 19 is disposed at a location of the body section 1 at which it opposes to the reed switch 18 when the cover section 2 is folded on the body section 1 so that it may operate the reed switch 18. Here, when the cover section 2 is folded on the body section 1, the reed switch 18 is positioned in the proximity of and hence in a magnetic field of the magnet 19 as seen from FIG. 2, and consequently, the reed switch 18 is switched on by the magnetic force of the magnet 19.

Figure 3:
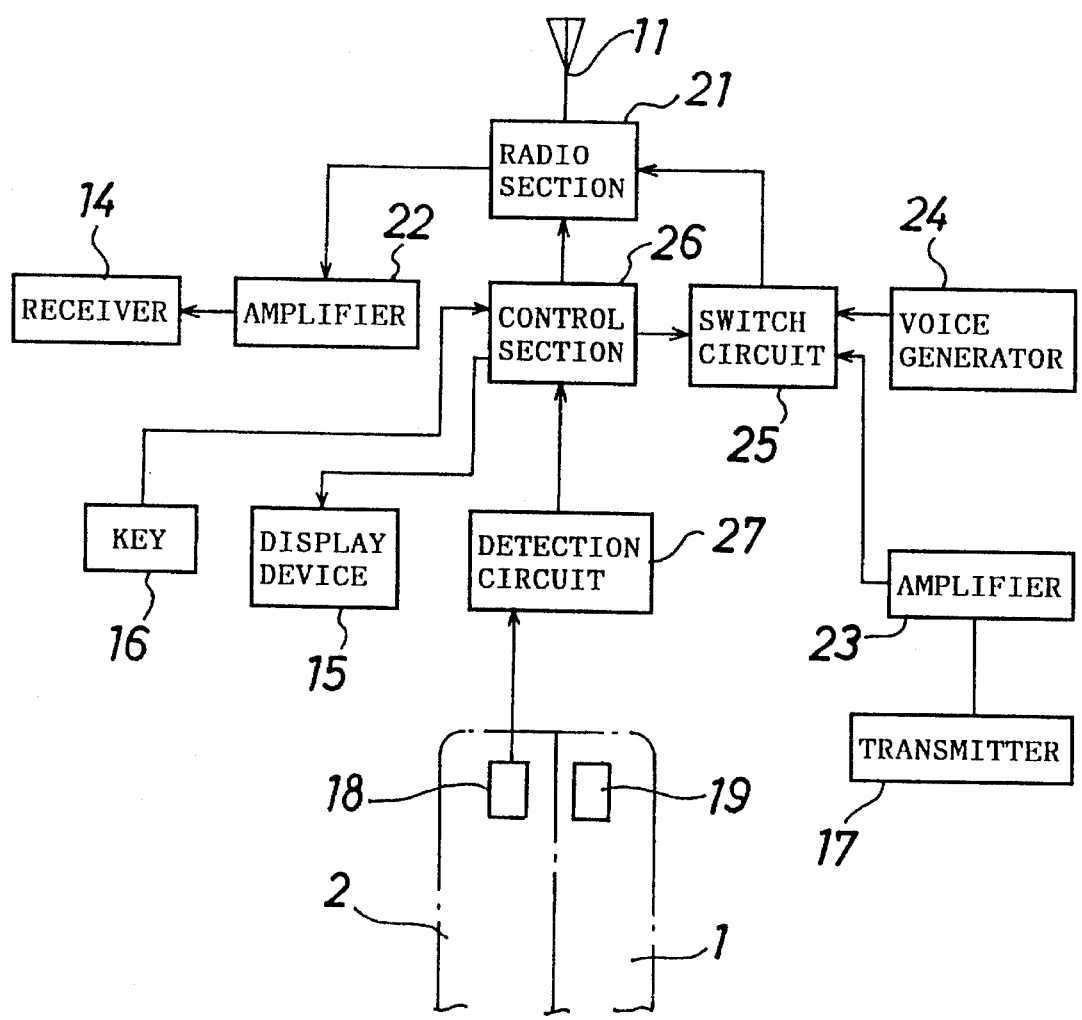
FIG. 3 is a block diagram showing a circuit construction of the telephone set of FIGS. 1(a) and 1(b).

FIG. 3 shows an internal circuit construction of the telephone set described above. Referring now to FIG. 3, a radio section 21 performs communications of signals with the other party side by way of the antenna 11. A signal received by the radio section 21 is amplified by an amplifier 22 and outputted as sound from the receiver 14. On the other hand, an audio signal from the transmitter 17 is amplified by an amplifier 23 and transmitted from the radio section 21 toward the other party side. A voice generator 24 generates a speech holding message and transmits it from the radio section 21. The signals of the transmitter 17 and the voice generator 24 are switched by means of a switch circuit 25 and selectively outputted to the radio section 21.

A control section 26 is connected to the radio section 21, and operation information from the manually operable keys 16 is inputted to the control section 26. Also information from a detection circuit 27 which detects on or off information of the reed switch 18 is inputted to the control section 26. The switch information is utilized as information to switch the switch circuit 25. Further, various pieces of information are displayed on the display device 15.

Operation of the foldable portable telephone set having the construction described above will be described subsequently. When the body section 1 and the cover section 2 are opened by way of the hinge mechanism 3 as shown in FIG. 1, the telephone set can be used as an ordinary portable telephone set. In particular, if the manually operable keys 16 are manually operated, then information of such selective manual operation of the manually operable keys 16 is inputted to the control section 26. Consequently, the control section 26 performs a predetermined call originating or terminating operation so that the telephone set enters a speaking condition with the other party side. In this instance, since the reed switch 18 disposed on the cover section 2 and the magnet 19 disposed on the body section 1 are positioned spaced away from each other, the reed switch 18 is in an off-state. The detection circuit 27 detects the off-state of the reed switch 18 and inputs this switch information to the control section 26. Consequently, the control section 26 switches the switch circuit 25 to the transmitter 17 side so that voice from the transmitter 17 amplified by the amplifier 23 is inputted to the radio section 21, from which it is transmitted to the other side. On the other hand, a signal from the other party side received by the radio section 21 is amplified by the amplifier 22 and outputted as an audio signal from the receiver 14. In this speaking condition, necessary information is displayed on the display device 15.

Then, if it is intended to change the condition of the telephone set from the speaking condition to a speech holding condition, then the cover section 2 will be closed to the body section 1 to put the telephone set into a folded condition as shown in FIG. 2. Consequently, the magnet 19 comes to the proximity of the reed switch 18, and thereupon, the reed switch 18 is put into an on-state. The detection circuit 27 detects the on-state of the reed switch 18 and inputs this switch information to the control section 26. Consequently, the control section 26 switches the switch circuit 25 to the voice generator 24 so that an audio message that the speech is held is generated from the voice generator 24 and transmitted to the other party side from the radio section 21. Consequently, it is notified on the other party side that the present telephone set is in a speech holding condition, and the speech is held temporarily.

Thereafter, when the cover section 2 is opened again to restore the condition of the telephone set shown in FIG. 1 in order to resume the speech, then since the reed switch 18 is put back into an off-state, the detection circuit 27 detects this off-state and inputs this switch information to the control section 26. Consequently, the control section 26 switches the switch circuit 25 to the transmitter 17 to allow transmission, thereby recovering the speech. Simultaneously, transmission of the audio message from the voice generator 24 is stopped.

In this manner, if the cover section 2 is folded during speech, then the portable telephone set detects this and is automatically switched from a speaking condition to a speech holding condition. Consequently, the necessity of a switching operation by way of selective operation of the operation keys 16 is eliminated. Consequently, such a trouble that, upon manual operation for such switching, another key is operated in error to cause interruption of the speech, can be prevented. Further, in a speech holding condition of the telephone set, the cover section 2 is in a folded condition on the body section 1 and the operation keys 16 are covered with body section 1 and are not exposed to the outside. Consequently, the operation keys 16 cannot be manually operated at all, and such a trouble that the speech holding condition is canceled or the speech is disconnected inadvertently cannot occur.

It is possible to add a function of erasing the back light or the display itself of the display device 15, which is formed from liquid crystal, making use of the circuit described above with reference to FIG. 3.

This can be applied without modifying the construction of the block diagram of FIG. 3 in which the internal circuit construction of the telephone set is shown. Upon opening or closing movement of the telephone set, the on or off information of the reed switch 18 is detected by the detection circuit 27 and sent to the control section 26. While such on or off information of the reed switch 18 is utilized as information to switch the switch circuit 25 in the embodiment described above, the information can be utilized otherwise as information for controlling the back light or the display itself of the display device 15. When the telephone set is in a closed condition, the display 15 need not necessarily display since it is at a position at which it is not visually observed from the outside. Therefore, the signal is transmitted from the control section 26 to the display device 15 so as to erase the back light or the display itself of the display device 15. When the signal represents that the telephone set is closed, the back light or the display of the display device 15 is extinguished. On the contrary when the telephone set is opened, a signal is sent from the control 26 to the display device 15 so that that the display device 15 may display. In response to the signal, the back light or the display of the display device 15 is returned to its original condition.

The present construction is advantageous in that the function described above can be additionally provided without modifying the circuit construction of the telephone set, and besides the power dissipation can be reduced by the function.

It is to be noted that, while the reed switch is provided on the cover section and the magnet is provided on the body section in the embodiment described above, the arrangement of them may be reversed relative to each other. Further, while the open or closed condition of the cover section is detected by means of the reed switch in the embodiment described above, a switch of some other suitable construction such as, for example, a limit switch which mechanically detects an open condition of the cover section or a like switch may be utilized alternatively.

Further, while, in the embodiment described above, a holding message is transmitted when the telephone set is in a speech holding condition, it is otherwise possible to construct the telephone set so that a mere holding sound, a melody stored in advance or some other suitable sound is transmitted. In this instance, a memory constituted from a RAM or a like device may be provided in place of the sound generator.

Having now fully described the invention, it will be apparent to one of ordinary skill in the art that many changes and modifications can be made thereto without departing from the spirit and scope of the invention as set forth herein.

What is claimed is:

1. A foldable portable telephone set, comprising:
   a body section;
   a cover section hinged to said body section for opening and closing movement relative to said body section;
   a magnetic field responsive switch provided on one of said body section and said cover section;
   a magnet provided on the other of said body section and said cover section such that said magnet is positioned adjacent to said magnetic field responsive switch when said cover section is in a closed position; and
   means connected to said magnetic field responsive switch for establishing a speech holding condition when said cover section is in said closed position.

2. A foldable portable telephone set as claimed in claim 1, further comprising a microphone, means for generating a speech holding message, and a switch circuit for switching between said microphone and said speech holding message generation means, said switch circuit being switched to said speech holding message generation means when it is detected that said cover section is in said closed position.

3. A foldable portable telephone set as claimed in claim 1, wherein said body section has a first predetermined length, width and thickness, and said cover section has a second predetermined length, width and thickness, and wherein said first predetermined thickness of said body section is substantially equal to said second predetermined thickness of said cover section.

4. A foldable portable telephone set, comprising:
   a body section having a receiver and a radio section built therein;
   a cover section having a transmitter built therein;
   a hinge mechanism connecting said body section to said cover section for allowing opening and closing pivotable movement of said cover section with respect to said body section to an open and closed position, respectively;
   a display device provided on said body section which is covered by said cover section when said cover section is in said closed position;
   a power source switch provided on said body section;
   an antenna provided on said body section, said antenna being electrically coupled to said radio section;
   a plurality of operation means provided on said cover section;
   detection means provided on one of said body section and said cover section for detecting whether said cover section is in said open position or said closed position, and outputting a signal indicative of whether said cover section is in said open position or said closed position; and
   control means for receiving the signal from said detection means controlling said display device between an on-state and an off-state, and for connecting said transmitter to said radio section when said cover section is in said open position to establish a speaking condition, and for disconnecting said transmitter from said radio section to establish a speech holding condition when said cover section is in said closed state, and thereafter connecting said transmitter back to said radio section when said cover section is placed back into said open state, to thereby restore the speaking condition.

5. A foldable portable telephone set as claimed in claim 4, wherein said detection means comprises a reed switch provided on one of said body section and said cover section, a magnet provided on the other of said body section and said cover section, such that said magnet is positioned adjacent to said reed switch when said cover section is closed, and a detection circuit for detecting an on or off condition of said reed switch.

6. A foldable portable telephone set as claimed in claim 4, further comprising:
   speech generation means for generating a speech holding message; and
   switch means for connecting and disconnecting said transmitter and said speech generation means to and from said radio section under control of said control means,
   wherein when said cover section is in said open position, said transmitter is connected to said radio section and said speech generation means is disconnected from said radio section, and when said cover section is in said closed position, said speech generation means is connected to said radio section and said transmitter is disconnected from said radio section.

7. A foldable portable telephone set as claimed in claim 4, wherein said detection means comprises:
   a limit switch provided on one of said body section and said cover section, said limit switch being in an on condition when said cover section is in said closed position and said limit switch being in an off condition when said cover section is in said open position; and a detection circuit for detecting said on or off condition of said limit switch.

8. A foldable portable telephone set as claimed in claim 4, further comprising a memory means for storing a sound in digital form to be output through said transmitter when said cover section is in said closed position, said sound being indicative of said speech holding condition.

9. A foldable portable telephone set as claimed in claim 4, wherein said plurality of operation means are covered by said body section when said cover section is in said closed position, thereby maintaining said speech holding condition as long as said cover section is in said closed position.

* * * * *